H. O. BRUNTON.
ANTISLIPPING ATTACHMENT FOR TIRES.
APPLICATION FILED MAR. 26, 1915.

1,168,597.

Patented Jan. 18, 1916.

WITNESSES:
E. F. Lindman
Clarence Jorden

INVENTOR.
Henry O. Brunton
By James N. Ramsey
ATTORNEY.

UNITED STATES PATENT OFFICE.

HENRY O. BRUNTON, OF CINCINNATI, OHIO.

ANTISLIPPING ATTACHMENT FOR TIRES.

1,168,597.  Specification of Letters Patent.  Patented Jan. 18, 1916.

Application filed March 26, 1915. Serial No. 17,256.

*To all whom it may concern:*

Be it known that I, HENRY O. BRUNTON, a citizen of the United States, and a resident of Cincinnati, in the county of Hamilton and State of Ohio, have invented certain new and useful Improvements in Antislipping Attachments for Tires, of which the following is a specification.

My invention relates to resilient tires and wheels; and its object is to prevent slipping and skidding of the wheels of vehicles, especially of motor vehicle wheels, provided with either pneumatic or solid tires and to increase the traction of such vehicles.

My invention consists in the combination of parts and in the details of construction and arrangement of parts as will herein be more fully described and claimed.

Figure 1:
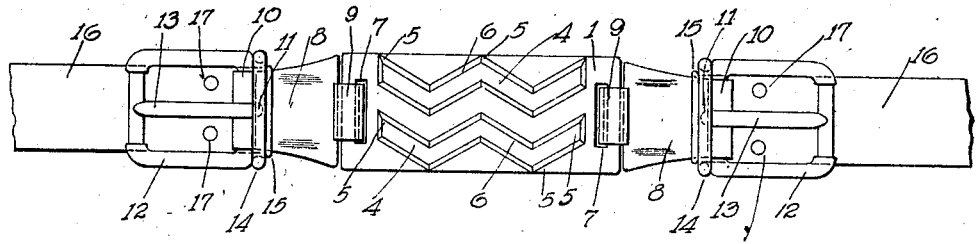
Figure 2:
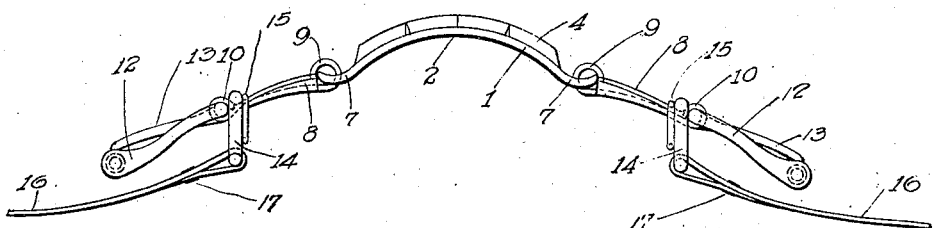
Figure 3:
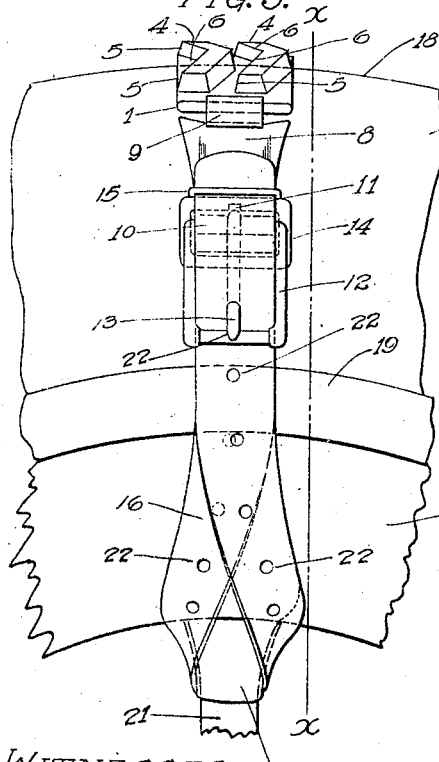
Figure 4:
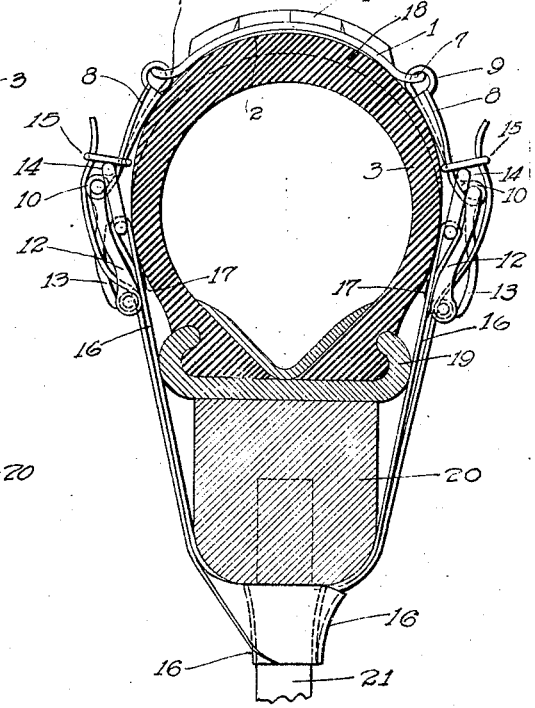

In the drawing: Figure 1 is a detail plan view of a device embodying my invention; Fig. 2 is a side or edge elevation of the same; Fig. 3 is a side elevation of part of a vehicle wheel and tire with my invention applied thereto; and Fig. 4 is a vertical section on the line $x$—$x$ of Fig. 3.

The tread piece 1 is of elongated substantially rectangular formation, and curved in the direction of its greatest length, so that it has a concave lower side 2 adapted to bear upon and across the tread of the tire 3, while the outer side of this tread piece 1 is convex and has thereon, preferably integral therewith, one or more calks 4 which, as here shown, are two in number, each substantially of the shape of the letter W somewhat elongated and with its height reduced, or of sinuated formation, as is clearly shown in Fig. 1. Preferably the angles or points 5 are left sharp as are also the edges 6 of the tops of these calks 4. The calks 4 terminate short of the ends of the tread piece 1 so that portions are left adjacent to the ends which are preferably curved upward and outward from the general curved shape of the tread piece 1, and in these curved parts are elongated slots 7 with lengths lying in the direction of the width of the tread piece.

Such a tread piece is preferably of drop-forged steel, and in addition to the above details of formation it is preferably constructed with well-rounded edges, so that while it lies directly upon the outer surface of the tread of the tire and is bound very firmly thereagainst, as well as pressed very heavily thereagainst under the weight of the vehicle, it will not, at any time, even with the greatest amount of rocking movement that may take place as permitted by the yieldingness of the tire, cut the material of the tire. At the same time, by constructing it of such material as drop-forged steel or other hard and strong material, the edges of the calks may be maintained comparatively sharp, so as to make effective engaging means with the surface of any roadway, or with packed snow, or ice, over which the vehicle may travel.

At each end of the tread piece 1 is a plate 8, with its end adjacent to the end of the tread piece preferably of substantially the same width as that of the tread piece, but with a loop 9 located centrally of it and of considerably less than the total width of it at this end, this loop engaging through the adjacent slot 7 in the adjacent upwardly and outwardly curved end part of the tread piece. The plate 8 preferably tapers somewhat in its width from this end adjacent to the tread piece out to its free end, where it has loops 10 at its sides, separated by a slot 11. The material of the plate 8 laterally outside the ends of the loop 9 is preferably bent upward, and this upward bending of these side parts of the plates is continued in decreasing degree up to the end which has the loops 10. By this means it is practicable to construct these plates 8 of sheet steel or similar wrought material, and by bending the side parts upward, insure against any cutting of the tire material where these plates are to bear thereagainst. It will of course be understood that these plates are out of the tread region of the tire, the tread piece 1 being of such dimensions that it extends well across the tread.

The plates 8 at each end of the tread piece receive in their loops buckles 12, the purpose of the slots 11 separating the two loops 10 being to accommodate the prongs 13 of the respective buckles. Embracing each plate and held therein by the laterally projecting parts of the buckle 12 are a large link and a small link 14 and 15, respectively, the former being adjacent to the buckle. Each of these links 14 and 15 is of only slightly greater length interiorly than the width of the plate near the buckle so that they have a very limited movement back on the plate from the buckle, the larger link being larger in its length and in the thickness of its material. To the lower transverse part of each link 14 at each end of the device is connected a strap 16 passed therearound and secured by rivets 17.

With the device constructed as above described and as clearly shown in Figs. 1 and 2, it may be applied to a tire and wheel as shown in Figs. 3 and 4. The tread piece 1 is placed upon the tread part 18 of the tire, and the plates 8, links 14 and straps 16 passed down opposite sides of the tire alongside the rim 19 and felly 20 of the wheel to a spoke 21. Then one of the straps is passed around the spoke and back up alongside the felly 20 and rim 19 and through the buckle 12 outside, where it is connected to the link 14, and the prong 13 of the buckle is passed through the proper one of the several perforations 22 which the strap has, in the usual manner of fastening a strap with a buckle. Then the end part of the strap is passed under the small link 15. After this the other strap 16, at the opposite side of the tire and wheel, is passed down and around the spoke and around and over the lateral parts of the first applied strap and then back up along the felly 20 and rim 19 and through the buckle 12 on this other side of the tire, being fastened in this buckle and in the link 15 on this side the same as the other strap is described above as having been fastened.

The binding effect of the two straps upon each other around the spoke is found in practice to be so effective that the tread piece 1 is firmly attached to the tire as soon as the fastening of the straps is completed. This completion of fastening is of course accompanied by a preliminary drawing of the strap tightly through the buckle before the final fastening by the prong in the proper opening; but due to the binding effect of the passage of the straps around the spoke as above described, the fastenings by the buckles are not compelled to carry any great part of the strain that is imposed upon the tread piece in operation. Thus the fastening and unfastening of the buckles is done with practically as great facility as any ordinary buckling or unbuckling operation; while, as I have found in practice, the tread piece 1 is held to the tire against lateral displacement practically as if it were an integral part of the tire structure or were riveted or otherwise permanently fixed to the tire; while any slight circumferential displacement only tightens the tread piece more. I thus provide a metallic tread part for the tire without any of the disadvantages or mutilation or weakening of the tire that would be attendant upon an attempt to permanently attach the metal to the tire structure itself, and which in fact would be wholly impractical; and at the same time I provide for the ready application and removal of the device to and from the tire and wheel. Withal, the device is extremely simple and comparatively inexpensive. Also, while being readily made amply strong for all of the strains that are imposed upon it, which in fact are very severe, it is also possible to make the device comparatively very light, so that it does not make the wheel cumbersome; and as it fits the wheel very closely and neatly it does not detract from the good appearance of the wheel.

It is not necessary to provide one of my devices at each spoke of a wheel, but usually one for each second spoke will be sufficient.

Having fully described my invention, what I claim as new and desire to secure by Letters Patent is:

1. In a device of the character described, in combination with a wheel comprising a tire and an internal fixed part, a tread piece lying across the tread of the tire and disposed substantially equally on each side of a radial line outward from said internal fixed part, flexible tension means connected to one end of the tread piece at one side of the tire and passed substantially radially inward to and engaged with said internal fixed part of the wheel and back to and fastened to said end of the tread piece, and another flexible tension means connected to the other end of the tread piece at the other side of the tire and passing substantially radially inward to and engaging with said first-mentioned tension means adjacent to said internal fixed part and passing back to said other end of the tread piece and connected to said other end, and binding said tread piece to the tire in the aforesaid position.

2. In a device of the character described, in combination with a wheel comprising a tire and an internal fixed part, a tread piece lying across the tread of the tire and disposed substantially equally on each side of a radial line outward from said internal fixed part, flexible tension means connected to one end of the tread piece at one side of the tire and passed substantially radially inward and around said internal fixed part and back to and fastened to said end of the tread piece, and another flexible tension means connected to the other end of the tread piece at the other side of the tire, and passing substantially radially inward around said internal fixed part and around parts of the first-mentioned tension means adjacent to said internal fixed part, and passing back to said other end of the tread piece and connected to said other end, and binding said tread piece to the tire in the aforesaid position.

3. In a device of the character described, in combination with a wheel comprising a tire and an internal fixed part, a rigid tread piece lying across the tread of the tire and disposed substantially equally on each side of a radial line outward from said internal fixed part, flexible tension means connected to one end of the tread piece at one side of the tire and passed substantially radially inward and around said internal fixed part and back to and fastened to said end of the tread piece, and another flexible tension means connected to the other end of the tread piece at the other side of the tire, and passing substantially radially inward around said internal fixed part and around parts of the first-mentioned tension means adjacent to said internal fixed part, and passing back to said other end of the tread piece and connected to said other end, and binding said tread piece to the tire in the aforesaid position.

4. In a device of the character described, in combination with a wheel comprising a tire and a spoke, a rigid tread piece lying across the tread of the tire, flexible tension means connected to one end of the tread piece and passed around the spoke and back to and fastened to said end of the tread piece, and another flexible tension means connected to the other end of the tread piece and passing around the spoke and around parts of the first mentioned tension means adjacent to the spoke, and passing back to said other end of the tread piece and connected to said other end and binding said tread piece to the tire in the aforesaid position.

5. In a device of the character described, in combination with a wheel comprising a tire and a spoke, a tread piece lying across the tread of the tire, tension means at one side of the tire, articulated means connecting one end of this tension means to the adjacent end of said tread piece at this side of the tire, this tension means passing around the spoke and back to said end of the tread piece, articulated means connecting this end thus brought back to said end of the tread piece, tension means at the other side of the tire, articulated means connecting one end of this other tension means to the adjacent end of the tread piece at this end of the tire, this other tension means passing down around the spoke and around parts of the first mentioned tension means adjacent to the spoke, and back to said other end of the tread piece, and articulated means at this other end of the tread piece connecting this end of the tension means thus brought back to this other end of the tread piece, said two tension means binding said tread piece to the tire in the aforesaid position.

HENRY O. BRUNTON.

Witnesses:
JAMES N. RAMSEY,
CLARENCE PERDEW.